Sept. 27, 1932.  J. W. PAGE  1,879,448
SPREADER
Filed Oct. 22, 1931
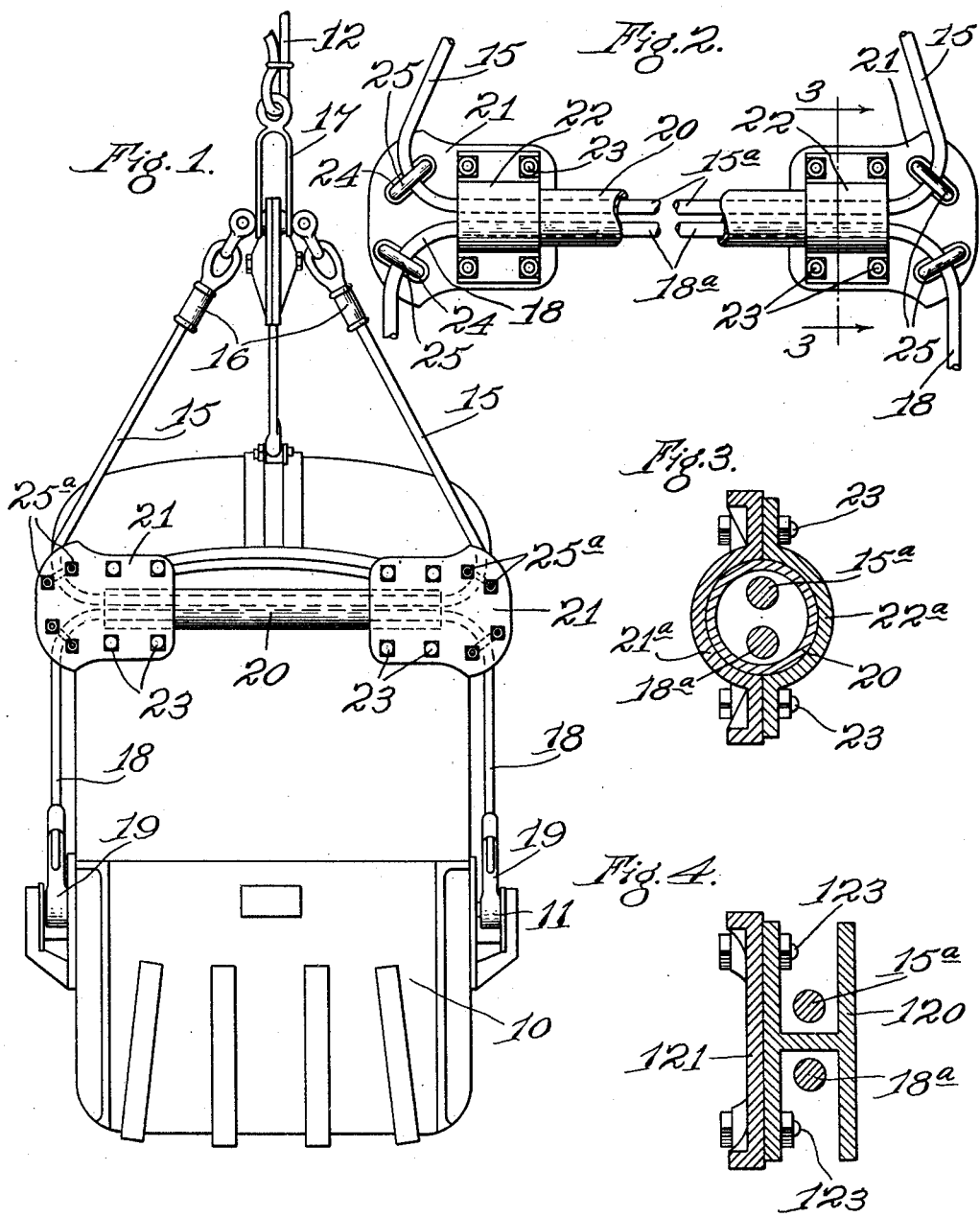
Inventor:
John W. Page.
By Dyrenforth, Lee, Chritton and Wiles
Attys.

Patented Sept. 27, 1932

1,879,448

UNITED STATES PATENT OFFICE

JOHN W. PAGE, OF CHICAGO, ILLINOIS

SPREADER

Application filed October 22, 1931. Serial No. 570,463.

This invention relates to improvements in spreaders and, more especially, such a device particularly adapted for use in the construction of a bail support out of cables.

Purely for the purpose of illustration, I have shown my improved spreader used in connection with the bail support on an excavating bucket of the Page type. It is to be understood, however, that the invention is capable of many other uses.

Among the features of my invention is the provision of a device permitting the formation of a bail support from separate pieces of cable. The device is so formed that the two ends of the bail may be easily equalized even after the entire bail is attached to the bucket and lifting means. This adjustment may be obtained also even though the two lengths of cable used are unequal. By the use of my invention, it is also possible to readily equalize the two sides of the bail at any time in the event any unevenness should occur by unequal stretching of portions of the cable. This equalizing can be accomplished by loosening the ends of the bail.

Other features and advantages of my invention will appear more fully as I proceed with my specification.

In that form of device embodying the features of my invention shown in the accompanying drawing—

Figure 1 is a view in front elevation of my improved device, showing the same in use on an excavating bucket of the type referred to; Fig. 2 is a similar view of the spreader alone on an enlarged scale; Fig. 3 is a view taken as indicated on the line 3 of Fig. 2; and Fig. 4 is a view similar to Fig. 3 showing a modified form.

As shown in the drawing, 10 may indicate an excavating bucket pivotally supported at 11, 11 by a suitable bail from the lifting line 12.

For the purpose of illustration, my invention is here shown as embodied in a spreader used to form the bail support between the lifting line 12 and the bucket 10 at the points 11, 11. To form this bail construction, I provide an upper piece of cable 15 with its upper ends attached by means of the connectors 16 to the yoke 17 carried on the lower end of the lifting line 12. I also provide a lower piece of cable 18 with its lower ends attached to the cable connectors 19 pivotally attached to the bucket at 11. It will be seen, therefore, that with two pieces of cable 15 and 18 having their ends connected as just described, all that is necessary further to make the bail construction is to provide means for holding the two opposed bights of the cable in spread position and means for locking the bights against longitudinal movement with respect to the spreader. If the two bights are held by a spreader in spread position, the two sides of the bail may be easily equalized at any time by merely shifting on or both of the bights in the spreader until the bail is symmetrical. When the equalization is obtained, the bights must be locked against further longitudinal movement.

As here shown, my spreader includes an elongated member 20 for holding the bights in spread position with portions thereof substantially straight and parallel. In the form shown in Figs. 1, 2 and 3, this elongated member is a tube. In the modified form shown in Fig. 4, the elongated member as indicated by 120 may be any kind of stiff or rigid member. For example, as shown in Fig. 4, an H-section beam is illustrated.

In the form shown in Figs. 1, 2 and 3, the tube member is large enough for the bights 15$^a$ and 18$^a$ of the two cables 15 and 18, respectively, to pass therethrough. These bights may be shifted longitudinally in the spreader, as desired, to equalize the two sides of the bail.

When the bail is equalized, the bights are locked against further longitudinal movement. This is accomplished by locking means supported on the ends of the elongated member. As here shown, such locking means includes at each end, two plates 21 and 22 fastened together by the bolts 23. These plates have curved portions 21$^a$ and 22$^a$ adapted to grip the end of the tube 20 when the plates are fastened together. The plate 21 is somewhat larger than the plate 22 and extends beyond the same. This plate is provided with two elongated openings 24 adapted to accommodate the U-bolts 25. One of the cables 15 and 18 at each end is passed under one of these U-bolts, and the latter are tightened by means of the nuts 25$^a$ to lock the cable against shifting.

In the modified form shown in Fig. 4, the plate 22 is dispensed with and the plate 121 is provided corresponding to the plate 21 except that the same is flat and fastened to one side of the member 120 by the bolts 123. It is to be understood that the plate 121 has an extension the same as the plate 21, provided with openings 24 accommodating U-bolts 25 adapted to lock the cables 15 and 18.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as permissible, in view of the prior art.

What I regard as new, and desire to secure by Letters Patent, is:

1. A device of the character described including; an elongated member for holding two opposed bights of cable in spread position with portions thereof substantially straight and parallel; and means for locking the bights against longitudinal movement, said means being supported on the end of the elongated member.

2. A device as claimed in claim 1, in which the means for locking the bights against longitudinal movement are releasable.

3. A device of the character described including; an elongated member for holding two opposed bights of cable in spread position with portions thereof substantially straight and parallel; and means for locking the bights against longitudinal movement, said means including a substantially flat plate supported on the end of the elongated member and provided with openings adapted to receive U-bolts.

In witness whereof, I have hereunto set my hand this 20th day of August, A. D. 1931.

JOHN W. PAGE.